US011479220B2

(12) United States Patent
Lewandowski et al.

(10) Patent No.: US 11,479,220 B2
(45) Date of Patent: Oct. 25, 2022

(54) ADAPTIVE CRUISE CONTROL

(71) Applicant: Ford Global Technologies, LLC, Dearborn, MI (US)

(72) Inventors: Andrew Denis Lewandowski, Sterling Heights, MI (US); Grant Patrick Mayer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 424 days.

(21) Appl. No.: 16/434,951

(22) Filed: Jun. 7, 2019

(65) Prior Publication Data

US 2020/0384964 A1  Dec. 10, 2020

(51) Int. Cl.
*B60T 8/171* (2006.01)
*B60T 8/17* (2006.01)

(52) U.S. Cl.
CPC ............... *B60T 8/171* (2013.01); *B60T 8/17* (2013.01); *B60T 2201/02* (2013.01); *B60T 2250/04* (2013.01)

(58) Field of Classification Search
CPC ........ B60T 8/171; B60T 8/17; B60T 2201/02; B60T 2250/04; B60T 2201/022; B60T 2201/081; B60W 30/16; B60W 30/143; B60W 2754/30; B60W 30/18163; G01S 13/931
See application file for complete search history.

(56) References Cited

U.S. PATENT DOCUMENTS

| 6,304,811 | B1 | 10/2001 | Prestl |
| 6,353,788 | B1 | 3/2002 | Bäker et al. |
| 6,842,687 | B2 | 1/2005 | Winner et al. |
| 6,985,805 | B2 | 1/2006 | Sudou et al. |
| 2006/0009910 | A1* | 1/2006 | Ewerhart .............. B60W 30/16 701/301 |
| 2011/0196592 | A1* | 8/2011 | Kashi .................... B60W 30/16 701/96 |
| 2014/0156164 | A1 | 6/2014 | Schuberth et al. |

FOREIGN PATENT DOCUMENTS

| DE | 10205225 A1 | 11/2003 | |
| EP | 2595135 A1 * | 5/2013 | ............... B60T 7/22 |
| JP | 200753191 A | 6/2007 | |

* cited by examiner

*Primary Examiner* — Faris S Almatrahi
*Assistant Examiner* — Andrew J Cromer
(74) *Attorney, Agent, or Firm* — Frank A. MacKezie; Bejin Bieneman PLC

(57) ABSTRACT

A system includes a computer having a processor and a memory storing instructions executable by the processor to determine a braking distance based on a gap distance between a primary vehicle and a second vehicle in an adjacent lane, and based on a speed of the second vehicle in the adjacent lane. The instructions include instructions to actuate a braking system of the primary vehicle when the primary vehicle is the braking distance from a third vehicle in a same lane as the primary vehicle.

17 Claims, 3 Drawing Sheets

ADAPTIVE CRUISE CONTROL

BACKGROUND

Autonomous and partially autonomous vehicles can perform operations such as setting or maintaining a vehicle velocity, following a particular route, and maintaining a specified distance from other vehicles. A vehicle velocity can be set and maintained according to user input and/or based on a velocity and/or relative position of a reference vehicle, typically an immediately preceding vehicle.

DETAILED DESCRIPTION

Figure 1:
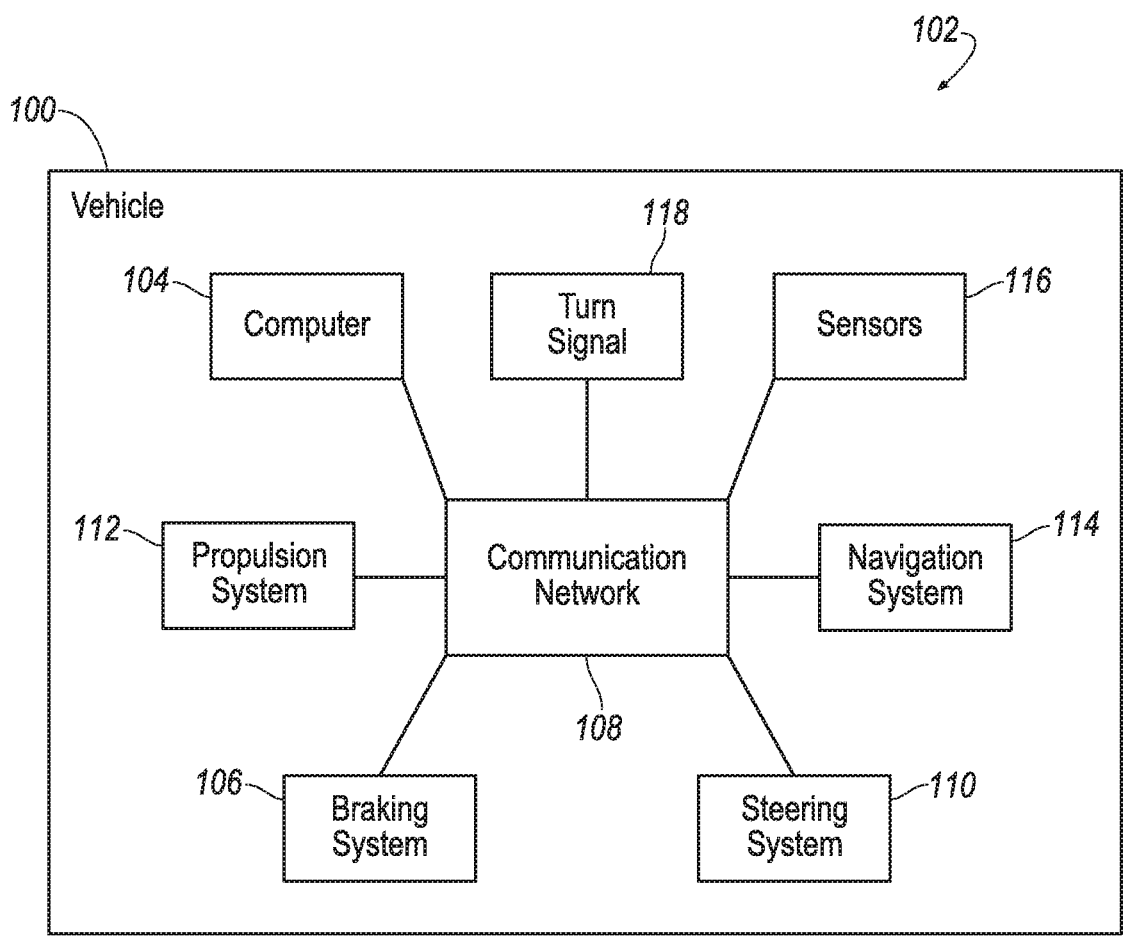
FIG. 1 is a block diagram of components of a vehicle.

A system includes a computer having a processor and a memory storing instructions executable by the processor to determine a braking distance based on a gap distance between a primary vehicle and a second vehicle in an adjacent lane, and based on a speed of the second vehicle in the adjacent lane. The instructions include instructions to actuate a braking system of the primary vehicle when the primary vehicle is the braking distance from a third vehicle in a same lane as the primary vehicle.

The instructions may include instructions to further determine the braking distance based on a difference between a speed of the primary vehicle and the speed of the second vehicle in the adjacent lane.

The instructions may include instructions to further determine the braking distance based on a difference between a speed of the third vehicle in the same lane as the primary vehicle and the speed of the second vehicle in the adjacent lane.

The instructions may include instructions to further determine the braking distance based on a determination of whether the second vehicle in the adjacent lane is forward of the primary vehicle.

The instructions may include instructions to further determine the braking distance based on a determination of whether the second vehicle in the adjacent lane is rearward of the primary vehicle.

The instructions may include instructions to further determine the braking distance based on a determination of whether the primary vehicle is indicating a lane change.

The instructions may further include instructions to actuate the braking system to decelerate the primary vehicle at a rate associated with the determined braking distance.

The instructions may include instructions to further determine the braking distance based on a determination of whether the second vehicle in the adjacent lane is in a passing lane.

The system may include a sensor and the braking system in communication with the computer, and the instructions may include instructions to determine the speed of the second vehicle in the adjacent lane based on data from the sensor.

A method includes determining a braking distance based on a gap distance between a primary vehicle and a second vehicle in an adjacent lane, and based on a speed of the second vehicle in the adjacent lane. The method includes actuating a braking system of the primary vehicle when the primary vehicle is at the braking distance from a third vehicle in a same lane as the primary vehicle.

The method may include determining the braking distance based on a difference between a speed of the primary vehicle and the speed of the second vehicle in the adjacent lane.

The method may include determining the braking distance based on a difference between a speed of the third vehicle in the same lane as the primary vehicle and the speed of the second vehicle in the adjacent lane.

The method may include determining the braking distance based on a determination of whether the second vehicle in the adjacent lane is forward of the primary vehicle.

The method may include determining the braking distance based on a determination of whether the second vehicle in the adjacent lane is rearward of the primary vehicle.

The method may include determining the braking distance based on a determination of whether the primary vehicle is indicating a lane change.

The method may include actuating the braking system to decelerate the primary vehicle at a rate associated with the determined braking distance.

The method may include determining the braking distance based on a determination of whether the second vehicle in the adjacent lane is in a passing lane.

A computer readable medium may store instructions executable by a processor to perform the method.

A system may include a computer having a processor and a memory storing instructions executable by the processor to perform the method.

The system may include a sensor and the braking system in communication with the computer, and wherein the instructions include instructions to determine the speed of the second vehicle in the adjacent lane based on data from the sensor.

A system includes means for determining a braking distance based on a gap distance between a primary vehicle and a second vehicle in an adjacent lane, and based on a speed of the second vehicle in the adjacent lane. The system includes means for braking the primary vehicle when the primary vehicle is at the braking distance from a third vehicle in a same lane as the primary vehicle.

The system may include means for determining the braking distance based on a difference between a speed of the primary vehicle and the speed of the second vehicle in the adjacent lane.

The system may include means for determining the braking distance based on a difference between a speed of the second vehicle in the same lane as the primary vehicle and the speed of the second vehicle in the adjacent lane.

As disclosed herein, adaptive cruise control of a primary vehicle can be provided to actuate brakes to optimize deceleration, e.g., minimize a rate of deceleration for occupant comfort, based on a reference distance from a second vehicle, and also to decelerate at a rate of deceleration higher than the optimized rate (up to zero deceleration) when a distance less than the reference distance is permitted, e.g., maintaining a speed of the primary vehicle as the primary vehicle approaches the second vehicle when a lane change is expected.

FIG. 1 illustrates a vehicle 100, referred to herein as a primary vehicle 100, having an example system 102 for determining braking distance BD (see FIG. 2) of the vehicle 100. The system 102 includes a computer 104 having a processor and a memory storing instructions executable by the processor to determine a braking distance based on a gap distance between the primary vehicle 100 and a vehicle in an adjacent lane, and based on a speed of the vehicle in the adjacent lane. The instructions further include instructions to actuate a braking system 106 of the primary vehicle 100 when the primary vehicle 100 is the braking distance from a vehicle in a same lane SL as the primary vehicle 100.

The primary vehicle 100 may be any type of passenger or commercial vehicle such as a car, a truck, a sport utility vehicle, a crossover vehicle, a van, a minivan, a taxi, a bus, etc.

The computer 104, implemented via circuits, chips, and/or other electronic components, is included in the system 102 for carrying out various operations, including as described herein. The computer 104 is a computing device that generally includes a processor and a memory, the memory including one or more forms of computer-readable media, and storing instructions executable by the processor for performing various operations, including as disclosed herein. The memory of the computer 104 further generally stores remote data received via various communications mechanisms; e.g., the computer 104 is generally configured for communications on a communication network 108 or the like, and/or for using other wired or wireless protocols, e.g., Bluetooth, etc. The computer 104 may also have a connection to an onboard diagnostics connector (OBD-II). Via the communication network 108 and/or other wired or wireless mechanisms, the computer 104 may transmit and receive messages to and from various devices in the primary vehicle 100, e.g., a steering system 110, the braking system 106, a propulsion system 112, a navigation system 114, sensors 116, a turn signal 118, etc. Although one computer 104 is shown in FIG. 1 for ease of illustration, it is to be understood that the computer 104 could include, and various operations described herein could be carried out by, one or more computing devices.

The communication network 108 may facilitate wired or wireless communication among the primary vehicle 100 components in accordance with a number of communication protocols such as controller area network (CAN), a communication bus, Ethernet, WiFi, Local Interconnect Network (LIN), and/or other wired or wireless mechanisms.

The braking system 106 resists motion of the primary vehicle 100 to thereby slow and/or stop the primary vehicle 100, e.g., in response to an instruction from the computer 104 and/or in response to an operator input, such as to a brake pedal. The braking system 106 may include friction brakes such as disc brakes, drum brakes, band brakes, and so on; regenerative brakes; any other suitable type of brakes; or a combination. The braking system 106 may be controlled by, and may report data via, an electronic control unit (ECU) or the like in communication with the computer 104.

The steering system 110 controls a steering angle of wheels of the primary vehicle 100, e.g., in response to an instruction from the computer 104 and/or in response to an operator input, such as to a steering wheel. The steering system 110 may be a rack-and-pinion system with electric power-assisted steering, a steer-by-wire system, or any other suitable system for controlling the steering angle of the wheels. The steering system 110 can be controlled by, and may report data via, an electronic control unit (ECU) or the like.

The propulsion system 112 translates energy into motion of the primary vehicle 100, e.g., in response to an instruction from the computer 104 and/or in response to an operator input, such as to an accelerator pedal. For example, the propulsion system 112 may include a conventional powertrain having an internal-combustion engine coupled to a transmission that transfers rotational motion to wheels; an electric powertrain having batteries, an electric motor, and a transmission that transfers rotational motion to the wheels; a hybrid powertrain having elements of the conventional powertrain and the electric powertrain; or any other type of structure for providing motion to the primary vehicle 100. The propulsion system 112 can be controlled by, and may report data via, an electronic control unit (ECU) or the like.

The navigation system 114 can determine a location of the primary vehicle 100. The navigation system 114 is implemented via circuits, chips, and/or other electronic components, and can include programming implemented in the foregoing hardware. The navigation system 114 may be implemented via satellite-based system such as the Global Positioning System (GPS). The navigation system 114 may triangulate the location of the primary vehicle 100 based on signals received from various satellites in the Earth's orbit. The navigation system 114 is programmed to output signals representing the location of the primary vehicle 100 to, e.g., the computer 104 via the communication network 108. In some instances, the navigation system 114 is programmed to determine a route from the present location to a future location. The navigation system 114 may access a virtual map stored in memory of the navigation system 114 and/or the computer 104 and develop the route according to the virtual map data. The virtual map data may include lane information, including a number of lanes of a road, widths and edges of such lanes, etc.

The primary vehicle 100 includes sensors 116. The sensors 116 may detect internal states of the primary vehicle 100, for example, wheel speed, wheel orientation, and engine and transmission values. The sensors 116 may detect the position or orientation of the primary vehicle 100, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 116 may detect the external world, for example, radar sensors, scanning laser range finders, light detection and ranging (LIDAR) devices, and image processing sensors such as cameras. The primary vehicle 100 may further include communications devices, for example, vehicle-to-infrastructure (V2I) or vehicle-to-vehicle (V2V) devices.

The turn signal 118 can be illuminated, e.g., in response to an instruction from the computer 104 and/or in response to an operator input, to a tun signal control lever on a steering column of the vehicle 100. The turn signal 118 may include structure that transforms electricity into visible light, e.g., a light bulb with a filament, an LED, etc.

Figure 2:
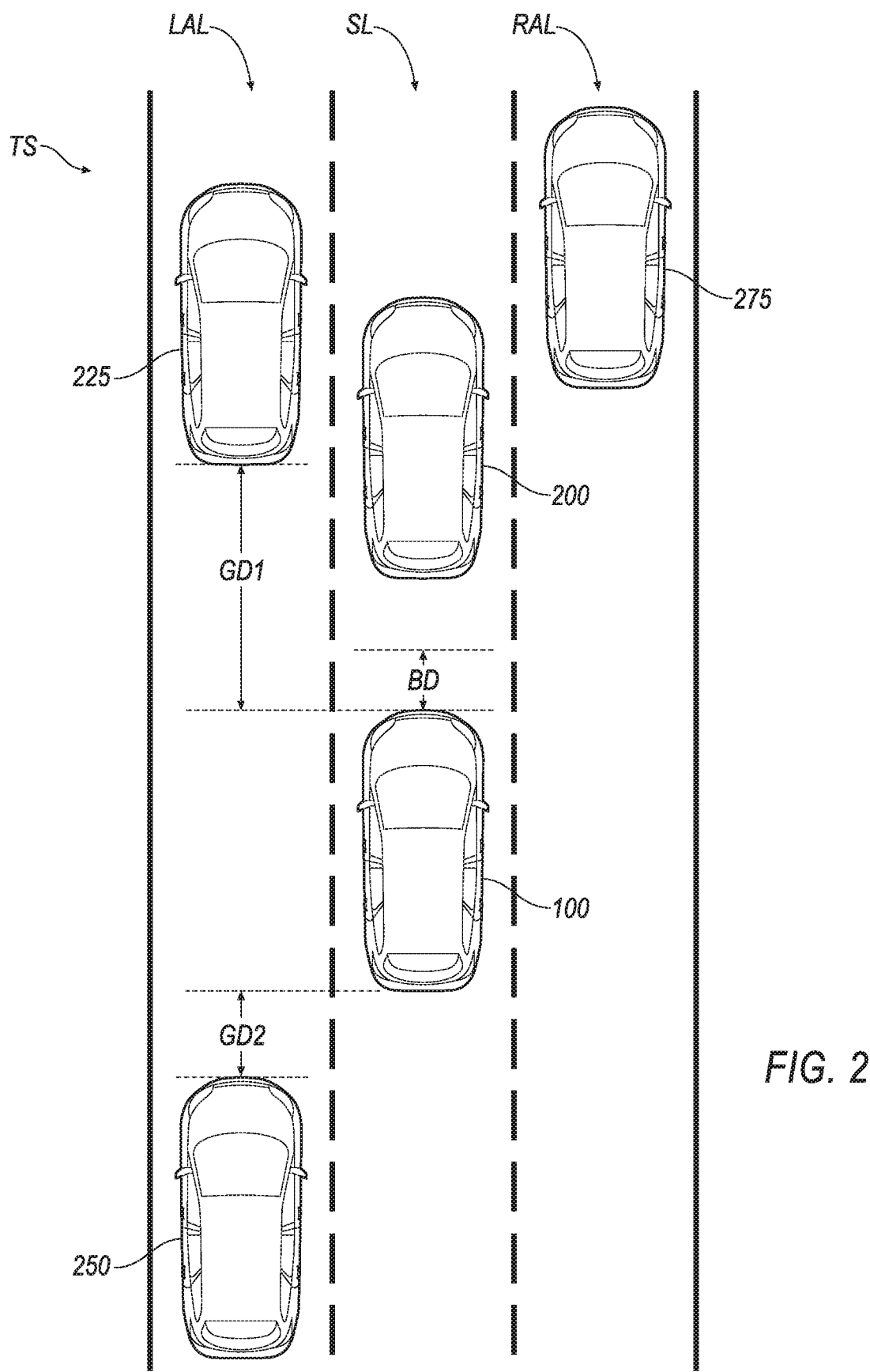
FIG. 2 is a diagram of a traffic scene including the vehicle of FIG. 1.

FIG. 2 is a diagram of an example traffic scene TS. The traffic scene TS includes the primary vehicle 100 and a second vehicle 200 in front of, and in a same lane SL as, the primary vehicle 100. The traffic scene TS includes a third vehicle 225 in front of, and a in left adjacent lane LAL relative to, the primary vehicle 100. The traffic scene TS includes a fourth vehicle 250 behind, and in the left adjacent lane LAL relative to, the primary vehicle 100. The traffic scene TS includes a fifth vehicle 275 in front of, and in a right adjacent lane RAL relative to, the primary vehicle 100. Gap distances GD1, GD2 between the primary vehicle 100 and the third vehicle 225 and the fourth vehicle 250 are also shown, respectively, as is the braking distance BD in front of the primary vehicle 100.

The computer 104 is programmed to, i.e., typically the memory stores instruction executable by the processor to, actuate the braking system 106. For example, the computer 104 may transmit an instruction to the braking system 106 via the communication network 108 instructing the braking system 106 to slow the primary vehicle 100. The instruction may specify a rate at which to slow the primary vehicle 100, e.g., a percent of total braking ability (such as 50%), a deceleration amount (such as 3 meters per second per second), etc.

The computer 104 is programmed to identify one or more vehicles, such as a second vehicle 200, a third vehicle 225, etc. The computer 104 may identify such vehicles based on data from the sensors 116 received via the communication network 108. The computer 104 may identify the one or more vehicles based on parameters, such as a size, shape, color, brightness, etc., of objects represented by data received from the sensors 116, e.g., image data from a camera and/or data from a LIDAR sensor, etc., e.g., using known image recognition and data processing techniques.

The computer 104 is programmed to determine lanes of the identified vehicles. The computer 104 may determine whether the identified vehicle is in the same lane SL as the primary vehicle 100. The computer 104 may determine whether the identified vehicle is in one of the adjacent lanes LAL, RAL to the primary vehicle 100. For example, the computer 104 may determine whether the identified vehicle is in the right adjacent lane RAL of the primary vehicle 100. As another example, the computer 104 may determine whether the vehicle is in left adjacent lane LAL of the primary vehicle 100. The computer 104 may determine the lane of the identified vehicle by using image data from a camera to identify lane markers of the lane SL of the primary vehicle 100 according to image recognition techniques and may identify that the identified vehicle is between such lane markers, to the left of such markers, or to the right of such markers. As another example, the computer 104 may determine the lane of the identified vehicle based on a position of the identified vehicle relative to the primary vehicle 100 as detected by the sensors 116, e.g., the identified vehicle may be determined to be in the same lane SL when the identified vehicle is within 5 degrees of being within a vehicle forward or rearward direction relative to the primary vehicle 100, the identified vehicle may be determined to be in the adjacent lane when the secondary vehicle is between 5 and 45 degrees of being within the vehicle forward or rearward direction relative to the primary vehicle 100. The computer 104 may use other techniques to determine the lane of the identified vehicle, such as using data from LIDAR sensors 116 to perform simultaneous location and mapping (SLAM) as is known.

The computer 104 is programmed to determine a longitudinal position of the identified vehicle relative to the primary vehicle 100. For example, the computer 104 may determine whether the identified vehicle 225, 250 in the adjacent lane is forward, rearward, or next to the primary vehicle 100. Forward of the primary vehicle 100 means that a rearmost point of the vehicle 225 is forward of a frontmost point of the primary vehicle 100. Rearward of the primary vehicle 100 means that a frontmost point of the vehicle 250 is rearward of a rearmost point of the primary vehicle 100. Next to the primary vehicle 100 means any point of the second vehicle 200 is between the frontmost point and the rearmost point of the primary vehicle 100.

The computer 104 may determine the longitudinal position of the identified vehicle based on data received from the sensors 116. For example, the computer 104 may determine the identified vehicle 225 is forward of the primary vehicle 100 based on image data from a forward-facing camera, proximity data from a forward-facing proximity sensor, and/or LIDAR data specifying the identified vehicle 225 as forward of the primary vehicle 100. As another example, the computer 104 may determine the identified vehicle 250 is rearward of the primary vehicle 100 based on image data from a rear-facing camera, proximity data from a rear-facing proximity sensor, and/or LIDAR data specifying the identified vehicle 250 is rearward of the primary vehicle 100.

The computer 104 is programmed to determine a distance from the primary vehicle 100 to the identified vehicle, e.g., a gap distance GD1, GD2, between the primary vehicle 100 and the vehicle 225, 250. The computer 104 may determine the distance from the primary vehicle 100 to such identified vehicle 225, 250 based on data from the sensors 116. For example, the computer 104 may use image data from a pair of cameras, e.g., based on binocular disparity analysis of the identified vehicle 225, 250 in such image data. As another example, the computer 104 may use data from a LIDAR sensor that specifies the distance. As a final example, the computer 104 may use data from a sonar sensor, radar sensor, etc., configured to determine the distance.

The computer 104 is programmed to determine a speed of one or more identified vehicles 200, 225, 250, 275. The speed of the identified vehicle 200, 225, 250, 275 may be absolute, i.e., relative to being stationary. The speed of the identified vehicle 200, 225, 250, 275 may be relative to the primary vehicle 100. The computer 104 may determine the speed of the identified vehicle 200, 225, 250, 275 based on data from the sensors 116. The computer 104 may determine the speed of the identified vehicle 200, 225, 250, 275 relative to the primary vehicle 100 by determining a change in the distance between the identified vehicle 200, 225, 250, 275 and the primary vehicle 100 over time.

For example, the computer 104 may determine the speed of the identified vehicle 200, 225, 250, 275 relative to the primary vehicle 100 with the formula $\Delta D/\Delta T$, where $\Delta D$ is a difference between a pair of distances from the primary vehicle 100 to the identified vehicle 200, 225, 250, 275 taken at different times and $\Delta T$ is an amount of time between when the pair of distances was determined. When $\Delta D$ is determined by subtracting the distance determined earlier in time from the distance determined later in time, and the identified vehicle 200, 225, 250, 275 is rearward of the primary vehicle 100, a positive value indicates that the identified vehicle 200, 225, 250, 275 is traveling faster than the primary vehicle 100. When $\Delta D$ is determined by subtracting the distance determined earlier in time from the distance determined later in time, and the identified vehicle 200, 225, 250, 275 is forward of the primary vehicle 100, a positive value indicates that the identified vehicle 200, 225, 250, 275 is traveling slower than the primary vehicle 100. The computer 104 may use other techniques to determine the speed of the identified vehicle 200, 225, 250, 275 relative to the primary vehicle 100.

The computer 104 may determine the absolute speed, i.e., speed with respect to the surface of the earth, of the identified vehicle 200, 225, 250, 275 by combining a speed of the primary vehicle 100 with the speed of the identified vehicle 200, 225, 250, 275 relative to the primary vehicle 100. The computer 104 may determine the speed of the primary vehicle 100 based on data from the sensors 116, e.g., data from a wheel speed sensor. The computer 104 may combine the speed of the primary vehicle 100 with the speed of the identified vehicle 200, 225, 250, 275 relative to the primary vehicle 100 by adding the speed of the primary vehicle 100 to the vehicle 200, 225, 250, 275 speed when the speed of the identified vehicle 200, 225, 250, 275 relative to the primary vehicle 100 indicates that the identified vehicle 200, 225, 250, 275 is traveling faster than the primary vehicle 100. The computer 104 may combine the speed of the primary vehicle 100 with the speed of the identified vehicle 200, 225, 250, 275 relative to the primary vehicle 100 by subtracting the speed of the identified vehicle 200, 225, 250, 275 relative to the primary vehicle 100 from the speed of the primary vehicle 100 when the speed of the identified vehicle 200, 225, 250, 275 relative to the primary vehicle 100 indicates that the identified vehicle 200, 225, 250, 275 is traveling slower than the primary vehicle 100. The computer 104 may use other techniques to determine the absolute speed of the identified vehicle 200, 225, 250, 275.

The computer 104 is programmed to determine whether the primary vehicle 100 is indicating a lane change. Indicating a lane change means that the primary vehicle 100 manifests one or more physical states detectable by the computer 104 in which the primary vehicle 100 is deemed more likely to navigate to the lane adjacent the primary vehicle 100 as compared to when such condition is not detected. For example, the computer 104 may identify actuation of the turn signal 118 of the primary vehicle 100 as indicating the lane change. The computer 104 may determine the turn signal 118 has been actuated based on data from the sensors 116, e.g., indicating a human operator has actuated the turn signal 118. As another example, the computer 104 may determine the primary vehicle 100 is indicating a lane change based on lateral acceleration of the vehicle 100, e.g., indicated by data from the sensors 116. As another example, the computer may determine the primary vehicle 100 is indicating a lane change based on image a data from a camera indicating the primary vehicle 100 is approaching or crossing a boundary between the lane SL the primary vehicle 100 is in and one of the adjacent lanes RAL, LAL. As one more example, the computer 104 may determine the primary vehicle 100 is indicating a lane change based on data from the navigation system 114, e.g., indicating the primary vehicle 100 is approaching or crossing a boundary between the lanes SL, LAL, RAL as specified in map data.

The computer 104 is programmed to determine the braking distance BD. Braking distance BD is a linear distance in front of the primary vehicle 100. The computer 104 uses the braking distance BD for control of the braking system 106, e.g., to command actuation the braking system 106 when an object, such as the second vehicle 200, is at the braking distance BD. The computer 104 determines the braking distance BD to control the braking system 106 in a manner that balances occupant comfort and vehicle performance, e.g., by determining a longer distance where the vehicle 100 is not expected to change lanes and a shorter distance where the vehicle 100 is expected to change lanes. The longer distance may be more comfortable for the occupant, while the shorter distance may be used to maintain speed of the vehicle 100 when changing lanes to pass the second vehicle 200.

The computer 104 determines the braking distance BD based on parameters, i.e., values that can change over time, that are detected and/or determined from data from the sensors 116, e.g., as described herein. The parameters include a gap distance GD1, GD2 between the primary vehicle 100 and a vehicle 225, 250 in an adjacent lane, a speed of the vehicle 225, 250 in the adjacent lane, a difference between a speed of the primary vehicle 100 and the speed of the vehicle 225, 250 in the adjacent lane, and/or a difference between a speed of the second vehicle 200 in the same lane SL as the primary vehicle 100 and the speed of the vehicle 225, 250 in the adjacent lane.

For example, the computer 104 may determine the braking distance BD with an equation, or the like that includes one or more of the parameters as input variables and the braking distance BD an output. The computer 104 may store multiple equations, e.g., one for use when the vehicle in the adjacent lane is forward of the primary vehicle 100, and another for use when the vehicle in the adjacent lane is rearward of the primary vehicle 100. An example equation for determining a braking score BS as a function of scores S1, S2, and S3, is shown below:

$$\frac{S1 + S2 + S3}{3} = BS. \qquad \text{Equation 1}$$

In Equation 1, the variable S1 specifies a unitless score, e.g., between zero and one, that is calculated based on the gap distance GD1, GD2 between the primary vehicle 100 and a vehicle 225, 250 in an adjacent lane. The score S1 may be calculated in relation to a predetermined gap distance high threshold, e.g., 100 meters, and a predetermined gap distance low threshold, e.g., 0 meters. The gap distance GD1, GD2 may be normalized to result in a score S1 of between zero and one. For example, the predetermined gap distance high threshold (and greater distances) may be associated with a score of zero. The predetermined gap distance low threshold (and lower distances) may be associated with a score S1 of one. The normalized unitless score S1 may be linearly scaled to the gap distance GD1, GD2. For example, a gap distance 50 percent above the low threshold and toward the high threshold, e.g., 50 meters, would have a score S1 of 0.5.

The predetermined gap distance high threshold and the predetermined gap distance low threshold for calculating the variable S1 may be stored in the memory of the computer 104. The predetermined gap distance high threshold and the predetermined gap distance low threshold may be determined based on empirical testing, simulation, analysis of real-world data, e.g., to identify situations where the predetermined gap distance high threshold and the predetermined gap distance low threshold correlate to whether an operator of the vehicle 100 is anticipated to change lanes to pass the vehicle 200 in front of and in the same lane SL as the primary vehicle 100. For example, the predetermined gap distance high threshold may be identified with analysis showing that an operator of the primary vehicle 100 is likely to change lanes to pass the vehicle 200 in front of and in the same lane SL of the primary vehicle 100 when the gap distance is equal to, or greater than the predetermined gap distance high threshold, and is increasing less likely to change lanes as the gap distance decreases from the predetermined gap distance high threshold. As another example, the predetermined gap distance low threshold may be identified with analysis showing that an operator of the primary vehicle 100 is unlikely to change lanes to pass the vehicle 200 in front of and in the same lane SL of the primary vehicle 100 when the gap distance is equal to, or less than the predetermined gap distance low threshold. As one more example, the predetermined gap distance low threshold may be identified with analysis showing that the vehicle 225, 250 in the adjacent lane LAL is likely to interfere with navigation the primary vehicle 100 (e.g., inhibiting the primary vehicle from changing lanes and passing the vehicle 200 in front of and in the same lane SL as the primary vehicle 100 by blocking a path of the primary vehicle 100).

The variable S2 specifies a unitless score, e.g., between zero and one, that is calculated based on a difference between the speed of the primary vehicle 100 and the speed of the vehicle 225, 250 in the adjacent lane LAL, i.e., the relative speed between the vehicles 100, 225, 250. The computer 104 may calculate the difference between the speeds by subtracting the speed of the primary vehicle 100 from the speed of the vehicle 225, 250 in the adjacent lane LAL, as described herein, or with other techniques. The score S2 may be calculated in relation to a predetermined high relative speed threshold, e.g., 10 kilometers per hour (kph), and a predetermined low relative speed threshold, e.g., 0 kph. The difference between the speed of the primary vehicle 100 and the speed of the vehicle 225, 250 in the adjacent lane LAL may be normalized to result in a score S2 of between zero and one. For example, the predetermined high relative speed threshold (and higher relative speeds) may be associated with a score S2 of one. The predetermined low relative speed threshold (and lower relative speeds) may be associated with a score S2 of zero. The normalized unitless score S2 may be linearly scaled to the relative speed between the vehicles 100, 225, 250. For example, a relative speed of 50 percent above the predetermined low relative speed threshold and toward predetermined high relative speed threshold would have a score S2 of 0.5.

The predetermined high relative speed threshold and the predetermined low relative speed threshold for determining the score S2 may be stored in the memory of the computer 104 and may be determined based on based on empirical testing, simulation, analysis of real-world data, e.g., as described for the predetermined gap distance low and high thresholds.

The variable S3 specifies a unitless score, e.g., between zero and one, that is calculated based on a difference between a speed of the vehicle 200 in the same lane SL as the primary vehicle 100 and the speed of the vehicle 225, 250 in the adjacent lane LAL, i.e., the relative speed between the vehicles 200, 225, 250. The computer 104 may calculate the difference between the speeds by subtracting the speed of the vehicle 200 in the same lane SL as the primary vehicle 100 from the speed of the vehicle 225, 250 in the adjacent lane LAL. The score S3 may be calculated in relation to a predetermined high relative speed threshold, e.g., 10 kilometers per hour (kph), and a predetermined low relative speed threshold, e.g., 0 kph. The difference between the speed of the vehicle 200 in the same lane SL as the primary vehicle 100 and the speed of the vehicle 225, 250 in the adjacent lane LAL may be normalized to result in a score S3 of between zero and one. For example, the predetermined high relative speed threshold (and higher relative speeds) may be associated with the score S3 of zero. The predetermined low relative speed threshold (and lower relative speeds) may be associated with the score S3 of one. The normalized unitless score S3 may be linearly scaled to the relative speed between the vehicles 200, 225, 250. For example, a relative speed of 50 percent above the predetermined low relative speed threshold and toward predetermined high relative speed threshold would have a score S2 of 0.5.

The predetermined high relative speed threshold and the predetermined low relative speed threshold for determining the score S3 may be stored in the memory of the computer 104 and may be determined based on based on empirical testing, simulation, analysis of real-world data, e.g., as described for the predetermined gap distance low and high thresholds.

The brake score BS output from Equation 1 specifies a unitless score that is correlated with various braking distances BD. For example, the brake score BS may be between zero and one. Zero may be associated with a predetermined minimum braking distance, e.g., 20 meters, and may have a scaled increase relative to the brake score BS, e.g., a brake score BS of 0.25 would yield a braking distance BD of 125% of the minimum braking distance, a brake score BS of 0.75 would yield a braking distance BD of 175% of the minimum braking distance, etc.

The predetermined minimum braking distance, may be stored in the memory of the computer 104. The predetermined minimum braking distance may be determined based on empirical testing, simulation, analysis of real-world data, e.g., to identify a minimum distance at which the braking system 106 may be actuated to avoid the primary vehicle 100 from impacting the vehicle 200 in front of and in the same lane SL as the primary vehicle 100.

Multiple thresholds, e.g., multiple predetermined minimum braking distances may be stored in the computer 104 and the computer 104 may select from among the multiple thresholds. For example, the computer 104 may store a lookup table or the like associating various speeds, e.g., speeds of the primary vehicle 100, relative speeds between the primary vehicle 100 and the vehicle 200 in front of and in the same lane SL as the primary vehicle 100, etc., with various predetermined minimum braking distances. An example lookup table is shown below:

TABLE 1

| Relative Speed | Minimum Braking Distance |
|---|---|
| 5 kph | 50 meters |
| 10 kph | 75 meters |
| 20 kph | 100 meters |

The lookup table may be populated based on empirical testing, simulation, analysis of real-world data, e.g., to identify minimum distances at which the braking system 106 may be actuated to avoid the primary vehicle 100 from impacting the vehicle 200 for various relative speeds and/or based on data indicating occupant comfort at various braking distances.

The computer 104 may select a specific predetermined minimum braking distance that is associated in the lookup table with a detected speed of the primary vehicle 100, a relative speed between the primary vehicle 100 and the vehicle 200 in front of and in the same lane SL as the primary vehicle 100, etc.

The computer 104 may determine the braking distance BD based on a determination of whether a secondary vehicle 225, 250 in the adjacent lane is forward or rearward of the primary vehicle 100. Whether the vehicle 225, 250 in the adjacent lane is forward or rearward of the primary vehicle 100 affects whether the vehicle 225, 250 may interfere with navigation the primary vehicle 100 (e.g., inhibiting the primary vehicle from changing lanes and passing the vehicle 200 in front of and in the same lane SL as the primary vehicle 100) for various relative speeds of the vehicles. For example, if the vehicle 225 is forward of and traveling faster than the primary vehicle 100, then the gap distance GD1 between the vehicle 225 and the primary vehicle 100 is increasing and the vehicle 225 is unlikely to interfere with navigation of the primary vehicle 100. On the other hand, if the vehicle 250 is rearward of and traveling faster than the primary vehicle 100, then the gap distance GD2 between the vehicle 250 and the primary vehicle 100 is decreasing and the vehicle 250 may be likely to interfere with navigation of the primary vehicle 100. As another example, if the vehicle 225 is forward of and traveling slower than the primary vehicle 100, then the gap distance GD1 between the secondary vehicle 225 and the primary vehicle 100 is decreasing and the vehicle 225 may be likely to interfere with navigation of the primary vehicle 100. On the other hand, if the secondary vehicle 250 is rearward of and traveling slower than the primary vehicle 100, then the gap distance GD2 between the vehicle 250 and the primary vehicle 100 is increasing and the vehicle 250 is unlikely to interfere with navigation of the primary vehicle 100.

The computer 104 may determine the braking distance BD based on the determination of whether the vehicle 225, 250 is forward or rearward of the primary vehicle 100 by first determining whether the vehicle 225, 250 is forward or rearward based on data from the sensors 116, e.g., as described herein. Next, the computer 104 may select one of the stored equations or look-up tables based on such determination. For example, the computer 104 may select one equation or lookup table when the vehicle 225 is determined to be forward of the primary vehicle 100 and may select another equation or lookup table when the vehicle 250 is determined to be rearward of the primary vehicle 100. The stored lookup tables and/or equations may include data specifying whether such lookup table or equation is for use when the vehicle 225, 250 is forward or rearward. The computer 104 may select the lookup table or equation with data specifying the determined forward or rearward position of the vehicle 225, 250 relative to the primary vehicle 100.

The computer 104 may determine the braking distance BD based on a determination of whether the vehicle 225, 250, 275 is in a passing lane. The passing lane is a lane of the road designated for passing other vehicles. The passing lane may be relative to the lane of the primary vehicle 100. For example, in the United States, the passing lane is typically the left adjacent lane LAL to the lane of the primary vehicle 100. The computer 104 may store data specifying the passing lane. The data may specify a relative relationship, e.g., the left adjacent lane LAL, or may specify a specific lane in map data. Upon determining the vehicle 275 is not in the passing lane, i.e., the passing lane is free other vehicles, the computer 104 may determine the braking distance BD as the minimum distance.

When multiple vehicles 225, 250, 275 are present in the adjacent lanes, the computer 104 may determine a braking distance for each of the vehicles 225, 250, 275, and then may select the greatest of such braking distances as the determined braking distance BD.

The computer 104 may determine the braking distance BD based on a determination of whether the primary vehicle 100 is indicating a lane change. The computer 104 may determine the primary vehicle 100 is indicating a lane change based on data from the sensors 116, e.g., as described herein. Upon determining the primary vehicle 100 is indicating a lane change, the computer 104 may determine the braking distance BD as the minimum distance.

In addition to determining the braking distance BD, the computer 104 may also determine a braking rate, i.e., a rate at which to decrease speed of the vehicle, e.g., e.g., a percent of total braking ability (such as 50%), a deceleration amount (such as 3 meters per second per second), etc. The computer 104 may determine the braking rate based on the determined braking distance BD or based on the brake score BS. As one example, the computer 104 may store a lookup table or the like associating various braking distances BD with various braking rates.

TABLE 2

| Braking Distance | Braking Rate |
| --- | --- |
| 50 meters | 15 meters per second per second |
| 75 meters | 10 meters per second per second |
| 100 meters | 5 meters per second per second |

The lookup table may be populated based on empirical testing, simulation, analysis of real-world data, e.g., to identify braking rates at which the braking system 106 may be actuated to avoid the primary vehicle 100 from impacting the vehicle 200 for various relative speeds and/or based on data indicating occupant comfort at various braking rates. The lookup table may be populated to slow the vehicle 100 at the maximum rate when the minimum braking distance BD is determined and to provide a progressively lower rate of deceleration as the braking distance BD increases.

As another example, a brake score BS of zero may be associated with a predetermined maximum braking rate, e.g., 10 meters per second per second, and may have a scaled decrease relative to an increase of the brake score BS. The brake score BS may be linearly scaled to the braking rate.

The computer 104 is programmed to actuate the braking system 106 of the primary vehicle 100. For example, the computer 104 may transmit a command to the braking system 106 via the communication network 108. The command may specify a rate at which to decelerate the primary vehicle 100.

The computer 104 may actuate the braking system 106 of the primary vehicle 100 when the primary vehicle 100 is at the braking distance BD from the vehicle 200 in the same lane SL as the primary vehicle 100. For example, the computer 104 may transmit a command to the braking system 106 when data from the sensors 116 specifies a distance between the primary vehicle 100 and the vehicle 200 is equal to or less that the determined braking distance BD. The computer 104 may actuate the braking system 106 to decelerate the primary vehicle 100 at the determined rate associated with the determined distance, e.g., the command transmitted to the braking system 106 may specify the rate determined with a lookup table or equation.

Figure 3:
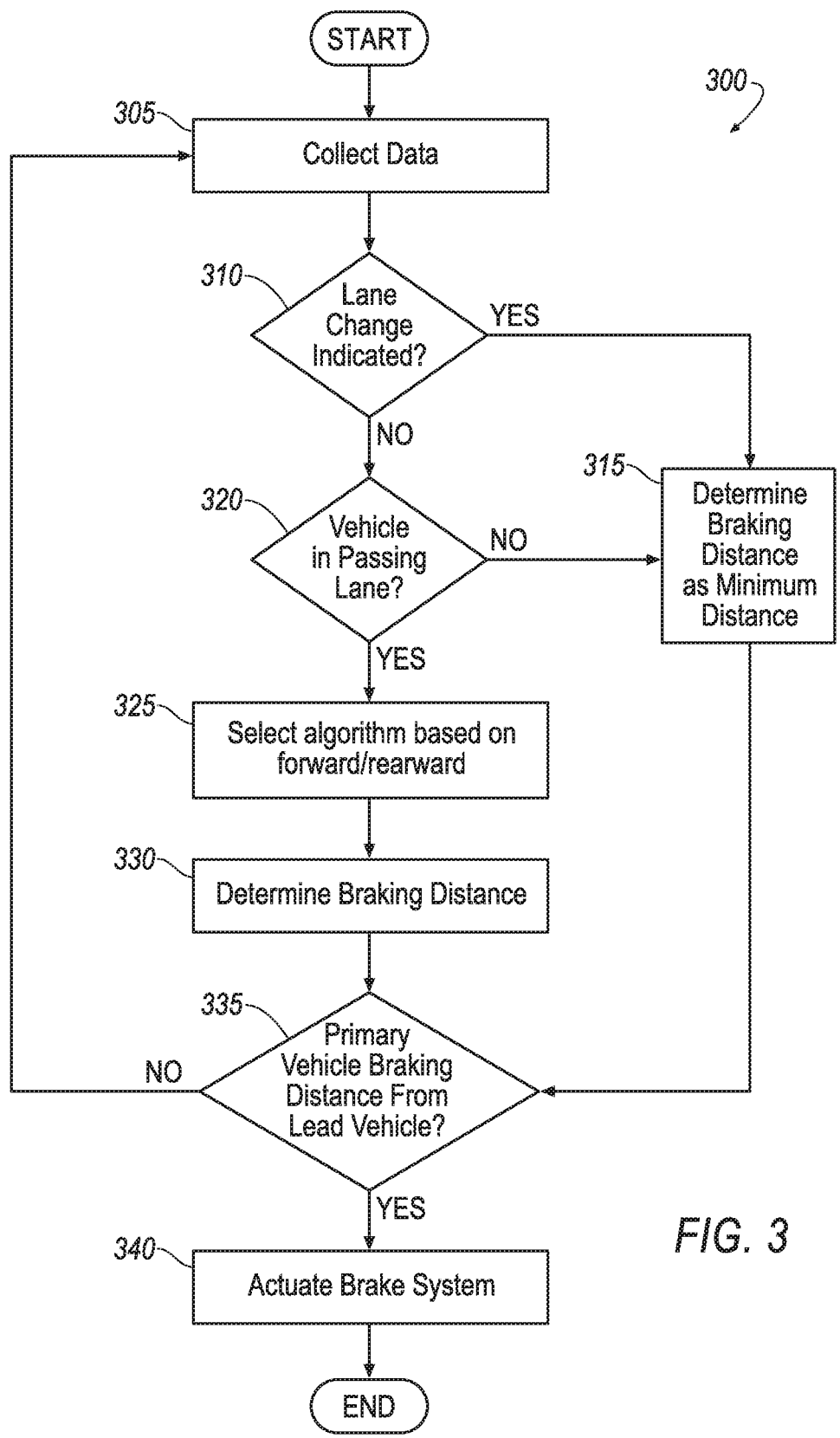
FIG. 3 is an illustration of a process for controlling the vehicle.

FIG. 3 is a process flow diagram illustrating an exemplary process 300 for operating the system 102. The process 300 begins in a block 305 where the computer 104 receives data from the sensors 116, the navigation system 114, etc., e.g., via the communication network 108. The computer 104 may receive such data substantially continuously or at time intervals, e.g., every 50 milliseconds. The computer 104 may store the data, in the memory.

Next at a block 310 the computer 104 determines whether the primary vehicle 100 is indicating a lane change, e.g., based on data from the sensors 116 and as described herein. Upon determining the primary vehicle 100 is indicating a lane change the process 300 moves to a block 315. Upon determining the primary vehicle 100 is not indicating a lane change the process 300 moves to a block 320.

At the block 315 the computer 104 determines the braking distance BD as the minimum distance. The computer 104 may also determine the braking rate as the maximum rate. After the block 315 the process 300 moves to a block 335.

At the block 320 the computer 104 determines whether a vehicle 225, 250 is detected in a passing lane, e.g., the left adjacent lane LAL, relative to the primary vehicle 100. Upon determining that the vehicle 225, 250 is in the left adjacent lane LAL the process moves to a block 325. Upon determining that no vehicles are detected in the left adjacent lane LAL the process 300 moves to the block 315.

At the block 325 the computer 104 determines whether the vehicle 225, 250 is forward or rearward of the primary vehicle 100. The computer 104 then selects an equation based on whether the vehicle 225, 250 is forward or rearward of the primary vehicle 100. For example, the computer 104 may select an equation specifying forward when the vehicle 225 is forward of the primary vehicle 100. The computer 104 may select an equation specifying rearward when the vehicle 250 is rearward of the primary vehicle 100.

At a block 330 the computer 104 determines the braking distance BD based a gap distance GD1, GD2 between the primary vehicle 100 and the vehicle 225, 250, the speed of the vehicle 225, 250, a difference between the speed of the primary vehicle 100 and the speed of the vehicle 225, 250, and/or a difference between a speed of a vehicle 200 in the same lane SL as the primary vehicle 100 and the speed of the vehicle 225, 250 in the left adjacent lane LAL. For example, the computer 104 may use data from the sensors 116 and the equation or lookup table selected at the block 325, and as described herein. The computer may additionally determine a braking rate, e.g., as described above.

When multiple vehicles 225, 250 are detected in the left adjacent lane LAL, the computer 104 may execute the blocks 320-330 for each of the vehicles 225, 250, and select the longest braking distance BD thus obtained as the braking distance BD for use in subsequent blocks of the process 300, beginning with a block 335.

At the block 335 the computer 104 determines whether the primary vehicle 100 is the braking distance BD from the vehicle 200. In other words, the computer 104 determines whether a distance between the primary vehicle 100 and the vehicle 200 in the same lane SL and in front of the primary vehicle 100 is equal to or less than the braking distance BD determined at the block 315 or the block 330. Upon determining that the primary vehicle 100 is the braking distance BD from the vehicle 200 the process 300 moves to a block 340. Upon determining that the primary vehicle 100 is not the braking distance BD from the vehicle 200 the process 300 returns to the block 310.

At the block 340 the computer 104 actuates the braking system 106 to slow the primary vehicle 100. For example, the computer 104 may transmit a command to a braking system 106 ECU, including data specifying the braking rate determined at the block 315 or the block 330. After the block 340 the process 300 may end. Alternately, the process 300 may return to the block 310.

With regard to the process described herein, it should be understood that, although the steps of such process have been described as occurring according to a certain ordered sequence, such process could be practiced with the described steps performed in an order other than the order described herein. It further should be understood that certain steps could be performed simultaneously, that other steps could be added, or that certain steps described herein could be omitted. In other words, the description of the process herein is provided for the purpose of illustrating certain embodiments and should in no way be construed so as to limit the disclosed subject matter.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
a computer having a processor and a memory storing instructions executable by the processor to:
determine a braking distance based on a gap distance between a primary vehicle and a second vehicle in an adjacent lane, based on a speed of the second vehicle in the adjacent lane, and based on a difference between a speed of a third vehicle in a same lane as the primary vehicle and the speed of the second vehicle in the adjacent lane; and
actuate a braking system of the primary vehicle when the primary vehicle is the braking distance determined based on the gap distance between the primary vehicle and the second vehicle in the adjacent lane from the third vehicle in the same lane as the primary vehicle.

2. The system of claim 1, wherein the instructions include instructions to further determine the braking distance based on a difference between a speed of the primary vehicle and the speed of the second vehicle in the adjacent lane.

3. The system of claim 1, wherein the instructions include instructions to further determine the braking distance based on a determination of whether the second vehicle in the adjacent lane is forward of the primary vehicle.

4. The system of claim 1, wherein the instructions include instructions to further determine the braking distance based on a determination of whether the second vehicle in the adjacent lane is rearward of the primary vehicle.

5. The system of claim 1, wherein the instructions include instructions to further determine the braking distance based on a determination of whether the primary vehicle is indicating a lane change.

6. The system of claim 1, wherein the instructions further include instructions to actuate the braking system to decelerate the primary vehicle at a rate associated with the determined braking distance.

7. The system of claim 1, wherein the instructions include instructions to further determine the braking distance based on a determination of whether the second vehicle in the adjacent lane is in a passing lane.

8. The system of claim 1, further comprising a sensor and the braking system in communication with the computer, and wherein the instructions include instructions to determine the speed of the second vehicle in the adjacent lane based on data from the sensor.

9. A method, comprising:
determining a braking distance based on a gap distance between a primary vehicle and a second vehicle in an adjacent lane, based on a speed of the second vehicle in the adjacent lane, and based on a difference between a speed of a third vehicle in a same lane as the primary vehicle and the speed of the second vehicle in the adjacent lane; and
actuating a braking system of the primary vehicle when the primary vehicle is at the braking distance determined based on the gap distance between the primary vehicle and the second vehicle in the adjacent lane from the third vehicle in the same lane as the primary vehicle.

10. The method of claim 9, further comprising determining the braking distance based on a difference between a speed of the primary vehicle and the speed of the second vehicle in the adjacent lane.

11. The method of claim 9, further comprising determining the braking distance based on a determination of whether the second vehicle in the adjacent lane is forward of the primary vehicle.

12. The method of claim 9, further comprising determining the braking distance based on a determination of whether the second vehicle in the adjacent lane is rearward of the primary vehicle.

13. The method of claim 9, further comprising determining the braking distance based on a determination of whether the primary vehicle is indicating a lane change.

14. The method of claim 9, further comprising actuating the braking system to decelerate the primary vehicle at a rate associated with the determined braking distance.

15. The method of claim 9, further comprising determining the braking distance based on a determination of whether the second vehicle in the adjacent lane is in a passing lane.

16. A system, comprising:
means for determining a braking distance based on a gap distance between a primary vehicle and a second vehicle in an adjacent lane, based on a speed of the second vehicle in the adjacent lane, and based on a difference between a speed of a third vehicle in a same lane as the primary vehicle and the speed of the second vehicle in the adjacent lane; and
means for braking the primary vehicle when the primary vehicle is at the braking distance determined based on the gap distance between the primary vehicle and the second vehicle in the adjacent lane from the third vehicle in the same lane as the primary vehicle.

17. The system of claim 16, further comprising means for determining the braking distance based on a difference between a speed of the primary vehicle and the speed of the second vehicle in the adjacent lane.

* * * * *